March 29, 1927.  J. H. WEBBER  1,622,933
REAR WINDOW
Filed Dec. 11, 1925
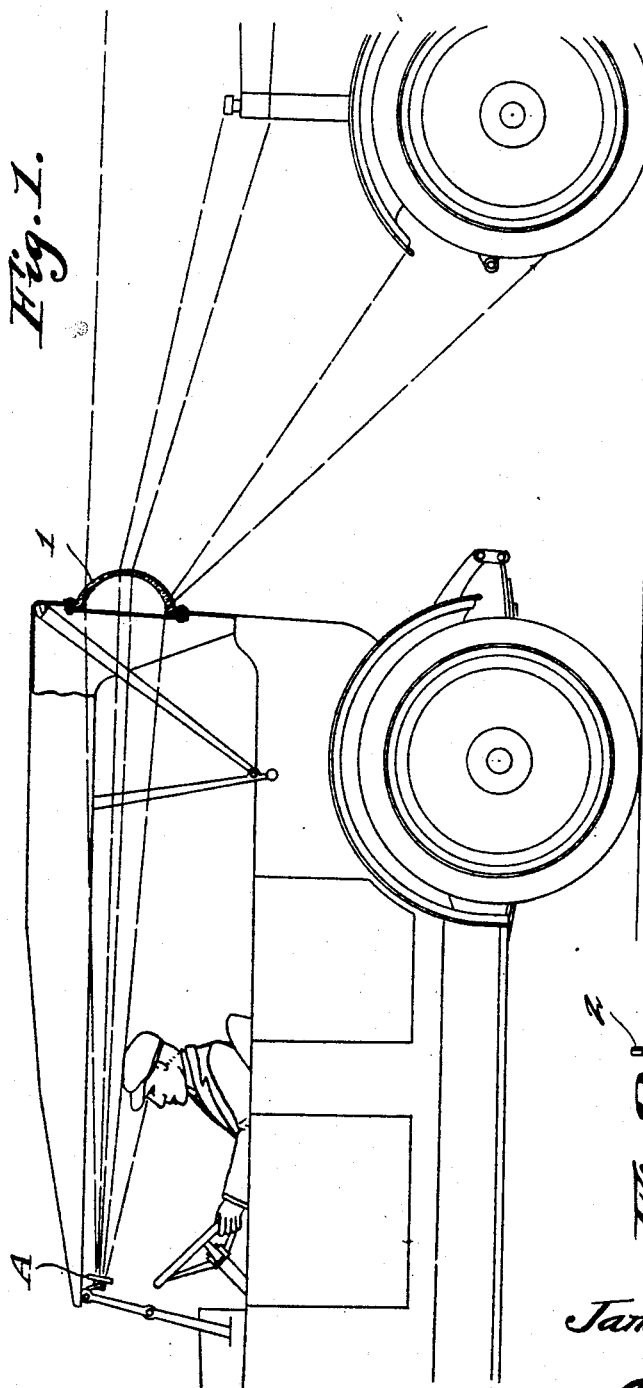
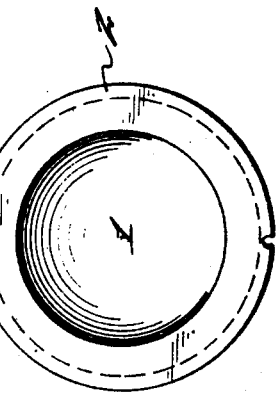
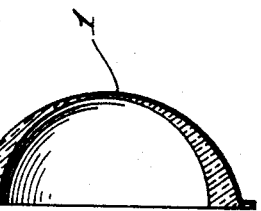
James H. Webber
INVENTOR
by Victor J. Evans
ATTORNEY
WITNESS:

Patented Mar. 29, 1927.

1,622,933

UNITED STATES PATENT OFFICE.

JAMES H. WEBBER, OF CARROLLTOWN, PENNSYLVANIA.

REAR WINDOW.

Application filed December 11, 1925. Serial No. 74,854.

This invention relates to an attachment for a vehicle, the general object being to provide a window at the rear of the vehicle which is so formed that when used with the rear vision mirror at the front of the vehicle, it will enable the driver to readily see reflections in the mirror of objects in back of the vehicle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the invention in use.

Figure 2 is a sectional view through the window.

Figure 3 is a view of the inner face thereof.

As shown in these views, the window at the rear of the vehicle is formed of a cup-shaped lens 1 which has a flange 2 thereon for enabling it to be fastened to the curtain or rear part of the vehicle. The lens gradually increases in thickness from its center, which is made very thin, to its outer part, so that the light rays will deflect, as shown in Figure 1, to enable a person looking into the mirror A to see objects in the rear of the vehicle, even where such objects are below the plane of the rear window. This will enable the driver of a motor vehicle to see small objects in back of the vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a motor vehicle having an opening in the rear thereof, of a cup shaped lens adapted to be positioned within said opening with the body of said lens gradually increasing in its thickness from the center, and an annular flange formed on the thickened portion of said lens to provide means whereby to attach the lens within the opening of the vehicle.

In testimony whereof I affix my signature.

JAMES H. WEBBER.